(12) United States Patent
Jiang et al.

(10) Patent No.: US 12,292,906 B2
(45) Date of Patent: May 6, 2025

(54) SYSTEMS AND METHODS FOR REAL-TIME DOCUMENT RECOMMENDATION

(71) Applicant: Salesforce, Inc., San Francisco, CA (US)

(72) Inventors: Feifei Jiang, San Mateo, CA (US); Aron Kale, San Francisco, CA (US); Anuprit Kale, Oakland, CA (US); Sitaram Asur, Newark, CA (US); Na Cheng, Yarrow Point, WA (US); Zachary Alexander, Berkeley, CA (US); Victor Yee, Oakland, CA (US); Fermin Ordaz, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 285 days.

(21) Appl. No.: 18/160,449

(22) Filed: Jan. 27, 2023

(65) Prior Publication Data

US 2024/0256581 A1    Aug. 1, 2024

(51) Int. Cl.
| | |
|---|---|
| *G06F 16/332* | (2019.01) |
| *G06F 16/33* | (2019.01) |
| *G06F 16/3329* | (2025.01) |
| *G06F 16/334* | (2025.01) |
| *G06F 40/263* | (2020.01) |

(52) U.S. Cl.
CPC ...... *G06F 16/3329* (2019.01); *G06F 16/3347* (2019.01); *G06F 40/263* (2020.01)

(58) Field of Classification Search
CPC . G06F 16/3329; G06F 16/3347; G06F 40/263
See application file for complete search history.

(56) References Cited

U.S. PATENT DOCUMENTS

2022/0156298 A1* 5/2022 Mahmoud ........... G06F 16/9535
2024/0411827 A1* 12/2024 Song ....................... G06F 40/40

FOREIGN PATENT DOCUMENTS

WO    WO-2023105262 A1 *  6/2023    ......... H04L 41/0631

* cited by examiner

*Primary Examiner* — Sonia L Gay (74) *Attorney, Agent, or Firm* — Haynes and Boone, LLP (57) ABSTRACT

Embodiments described herein provide systems and methods for document recommendation. A system receives a set of training data including a plurality of documents. The system determines whether the set of training data includes annotated contextual information corresponding to the plurality of documents. The system trains supervised and/or unsupervised models based on the availability of data. The models are used to generate vectors representing the documents. During a live text conversation, text from the conversation may be vectorized using the models and the vectors compared to those representing the documents in order to find the most relevant documents. The system may generate an indication of a recommended document.

21 Claims, 8 Drawing Sheets

SYSTEMS AND METHODS FOR REAL-TIME DOCUMENT RECOMMENDATION

TECHNICAL FIELD

The embodiments relate generally to natural language processing and machine learning systems, and more specifically to systems and methods for real-time document recommendation.

BACKGROUND

Corporations often maintain a database of articles which are used to preserve and share knowledge. For example, in a technical support scenario, a knowledge base may have articles related to solving specific technical issues. When an agent is communicating with a customer, they may confront a question for which it may be useful to refer to a specific article. Currently, agents must browse or search for specific articles when desired. Further, the amount and types of data available for training an automatic recommendation system may vary from system to system. Therefore, there is a need for improved systems and methods for document recommendation.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Corporations often maintain a database of articles which are used to preserve and share knowledge. For example, in a technical support scenario, a knowledge base may have articles related to solving specific technical issues. When an agent is communicating with a customer, they may confront a question for which it may be useful to refer to a specific article. Currently, agents must browse or search for specific articles when desired.

Embodiments described herein provide a pipeline that trains a document recommendation system during a real-time conversation depending on data availability. When a database of articles (e.g., help documents, etc.) are available but are usually unannotated (e.g., there is no additional label indicating what the scenario each individual article may be recommended for), then the document recommendation model may be trained in an unsupervised manner such that a vector representation of each article is produced based on the relative frequency of words in the document. On the other hand, if there is sufficient contextual information associated with the documents (e.g., previous dialogue associated with a recommendation of the document), this information may be used to perform supervised training to produce s a more context-aware vector representation of each article.

In one embodiment, document systems may have various datasets of articles relating to past use: some document recommendation systems may have labeled datasets (i.e. which documents have previously been explicitly selected as useful, given certain contexts), while others do not. Some have an extensive history of document interactions (e.g., which documents are most popular), while others do not. And finally, some have an extensive log of search data (i.e. which documents have been previously selected as useful, given specific search queries), while others do not. In this case, the proposed document recommendation training framework may be adapted to the different levels of data and context information availability of the recommendation system.

For example, the relative popularity of different articles may be tracked and used as context information in training the document recommendation system. For another example, recommendation models and the relevant training mechanism thereof may be chosen based on data availability. For another example, such determination of recommendation models and training mechanism may be updated progressively as available data may change over time, e.g., after a determination that sufficient data now exists, supervised training for relevant recommendation models may be implemented.

At inference stage, based on one or more trained recommendation models, a relevant document (article) may be recommended based on a similarity to a real-time text conversation (i.e., chat).

Embodiments described herein provide a number of benefits. For example, the same method may be utilized across different systems with varying amounts and types of information. For example, an organization that only has documents without any other information associated with the documents may still utilize the methods herein which would only train an unsupervised model, and use that model to recommend articles. A different system with more information about the documents, such as associated conversations, may also include a supervised model which may more accurately predict which document would be most useful. By periodically re-evaluating the data available, the method may continuously improve the document recommendation system by including additional models when there is sufficient data. This allows for a more efficient use of memory and power resources, at least for the fact that a supervised model is not trained if there is insufficient data to train it sufficiently well.

In some embodiments, data sources which may be used for training include the documents themselves (e.g., knowledge articles) which may be stored in a database; a database of search loges, which capture the queries users have historically made manually searching for documents; a database of text chat logs (i.e., LiveChatTranscript (LCT)); a database of cases which captures linkages between customer support cases and historical conversations (LCTs), and linkages between customer support cases and documents; and a database of data categories associated with each document.

Overview

Figure 1:
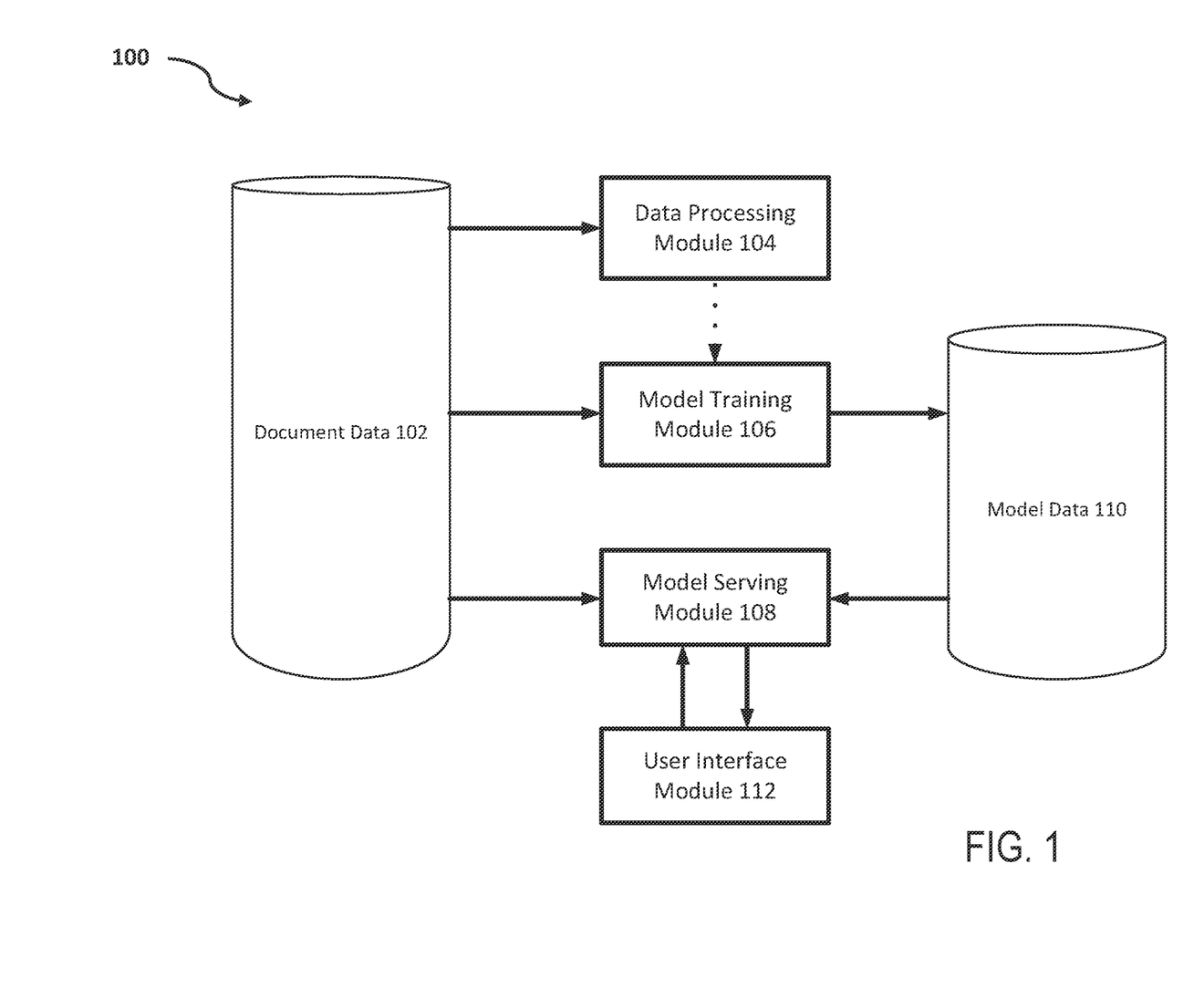
FIG. 1 is a simplified diagram illustrating a document recommendation framework according to some embodiments.

FIG. 1 is a simplified diagram illustrating a document recommendation framework 100 according to some embodiments. Framework 100 may be used to train and serve models for document recommendation, for example for recommending document based on a real-time text conversation. Framework 100 includes data processing module 104 and model training module 106 which may train models based on data stored in document data 102, storing the models in model data 110. Model serving module 108 may use the models in model data 110 to recommend documents from document data 102 to a user via user interface module 112.

Specifically, framework 100 includes document data 102 which includes the data stored by a system, for example in a memory on a server, related to a group of documents. Data may include the documents themselves, and other contextual information associated with the documents. For example, customer support cases may be stored in document data 102 along with text chat logs, search history information, and meta-information about the documents such as how frequently each document is accessed.

Data processing module 104 may perform a variety of tasks related to document data 102. Data processing module 104 may determine which models may be trained based on the availability of data in document data 102. For example, if sufficient contextual information is available (e.g., chat logs associated with documents), data processing module 104 may determine that a model may be trained using supervised training with the chat logs as the supervisory data. In some embodiments, a predetermined threshold is established against which the contextual data is compared. For example, data processing module 104 may determine that a supervised model may be trained if there are more than N usable chat logs available associated with the documents. In some embodiments, N is a fixed number. In other embodiments, N is determined in comparison to the number of documents (e.g., a requirement that there be a certain number of chat logs per document on average). The determination may also be based on the contents of the contextual data, rather than just its existence. For example, the length of the chat logs, where fewer chat logs may be necessary if they are on average above a certain length. Similarly, the determination may take into account the language of the chat logs, requiring a certain number of chat logs in a certain language.

Chat logs and other data may be either directly associated with documents, or indirectly associated. For example, document data 102 may include customer support cases, and an individual case may include multiple chat logs, and also multiple linked documents. In this way, the chat logs and documents may be associated with each other via their association with a case. Data processing module 104 may also perform tasks such as data clean up to put data into a format acceptable for training, may periodically monitor for changes in available training data, etc.

Model training module 106 may communicate with data processing module to determine when to train additional models. In some embodiments, model training module 106 determines times to refresh existing models and/or train additional models, and at that time checks with data processing module 104 to determine which models to train or re-train. A first model which may be trained by model training module 106 is an unsupervised model which is trained using only the documents themselves. Such a model may convert the text documents into numerical vectors that can be used to compare with vector representations of a real-time text conversation. The model and the vector representations of the documents generated by the model may be stored in model data 110. Given sufficient information, another model that may be generated by model training module 106 is a supervised model which is trained using data such as chat logs. The supervised model may likewise be used to vectorize the documents, and vectorize real-time text conversations so that the vectors may be compared for document recommendation. In some embodiments, two supervised models may be trained, one which is used to vectorize the documents, and another used to vectorize the real-time chat utterances for comparison. The models and vectors may be stored in model data 110. Additional data may be stored in model data 110 which does not require training. For example, "popularity" data about the documents, which may be based on how often a document is accessed or linked, may be stored such that a document recommendation may also be based on the popularity of the documents.

Model serving module 108 may use the trained models and stored vectors in order to provide document recommendations, for example to a user via user interface module 112. In some embodiments, mode serving module retrieves real-time text conversation data from user interface module 112. For example, each time a user sends or receives a message (i.e., "utterance"), the individual utterance may be vectorized using one or more of the models stored in model data 110. In some embodiments, rather than vectorizing each individual utterance, utterances may be concatenated together before using the model to provide a vector which represents the whole conversation, or a portion of the conversation. After vectorizing one or more utterance of the real-time conversation, model serving module may compare the one or more vectors with the vector representations of the documents. Based on the comparison, a ranking score may be generated, and one or more documents may be recommended based on the ranking score. Each of the models may provide an individual ranking score which is weighted and added to the other models' ranking scores to provide a composite ranking score. For example, given a collection of utterances associated with a real-time text conversation, an unsupervised model may provide a first ranking score, and a supervised model may provide a second ranking score. The supervised ranking score may be weighted double that of the unsupervised ranking score, and added to generate a composite ranking score. The document popularity may be used to further adjust the composite ranking score. For example, the popularity of a document may increase document's composite ranking score more for popular document than for relatively unpopular documents. Model serving module may provide the top-ranked document as a recommendation, or may provide the top N documents, where N may be a fixed number, or may be adjusted based on relative ranking scores. For example, a ranking score threshold may be predetermined, and the model serving module 108 may recommend all of the documents above the predetermined threshold to user interface module 112.

User interface module 112 may provide an interface to a user which may include the ability to have a text conversation with another user (e.g., a customer support client). User interface module 112 may provide conversation data to model serving module 108 and receive back document recommendations as described above with respect to model serving module 108. User interface module may display document recommendations on a physical display, such as a computer monitor or touch-screen device. The document recommendation may be in the form of a link which the user may click in order to access the entire document. In some embodiments, a portion of the recommended document may also be displayed together with the text conversation.

While document data 102 and model data 110 are illustrated separately, they may in some embodiments be stored in the same memory device and/or data structure such as a database.

Computer and Network Environment

Figure 2:
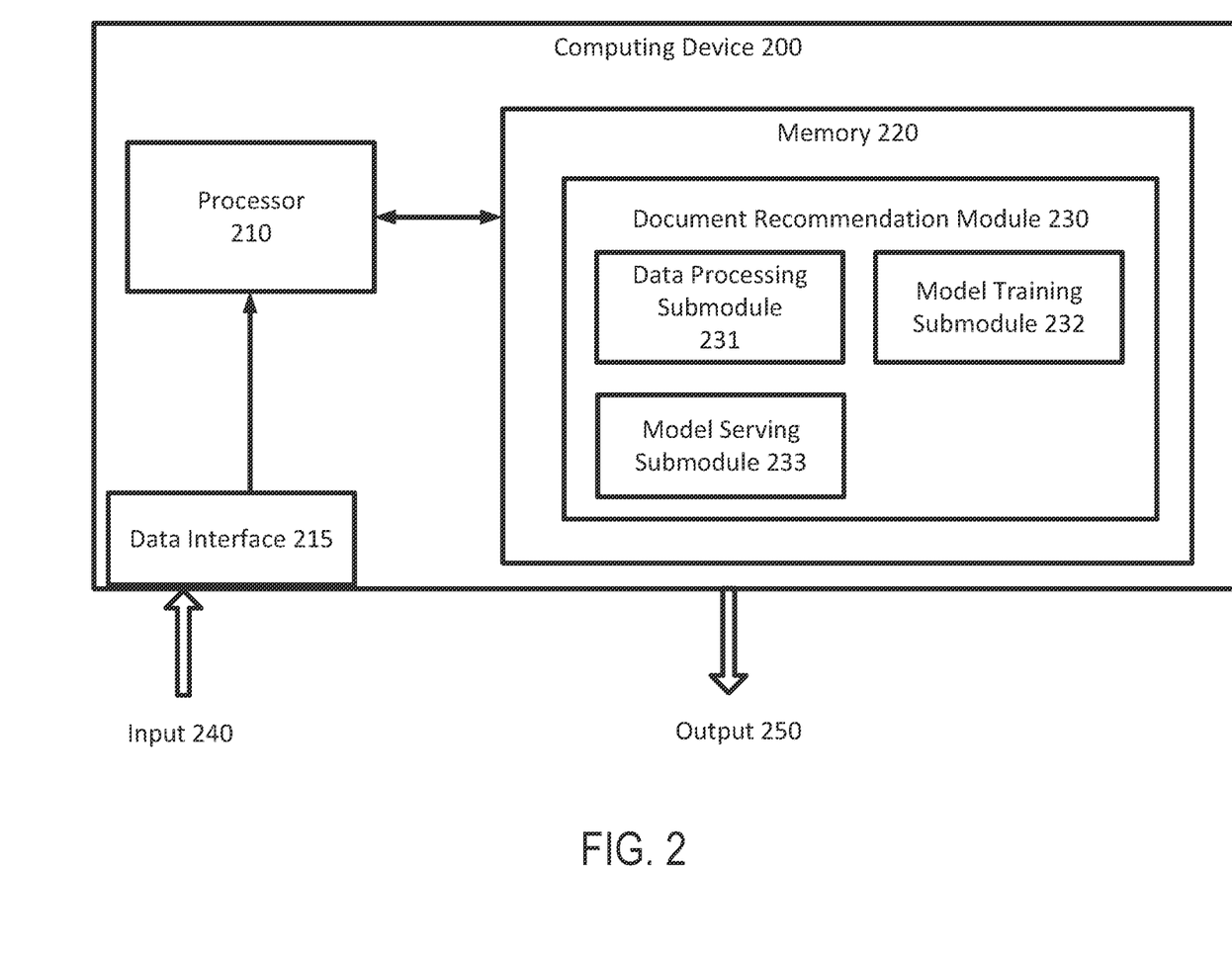
FIG. 2 is a simplified diagram illustrating a computing device implementing the document recommendation methods described according to some embodiments.

FIG. 2 is a simplified diagram illustrating a computing device implementing the document recommendation framework described in FIGS. 1 and 3-8. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

In some examples, memory 220 may include non-transitory, tangible, machine readable media that includes executable code that when run by one or more processors (e.g., processor 210) may cause the one or more processors to perform the methods described in further detail herein. For example, as shown, memory 220 includes instructions for document recommendation module 230 that may be used to implement and/or emulate the systems and models, and/or to implement any of the methods described further herein. Document recommendation module 230 may receive input 240 such as an input training data (e.g., documents, cases, conversation logs, search queries, etc.) via the data interface 215 and generate an output 250 which may be document representation vectors, vectorizing models, and document recommendations.

The data interface 215 may comprise a communication interface, a user interface (such as a voice input interface, a graphical user interface, and/or the like). For example, the computing device 200 may receive the input 240 (such as a training dataset) from a networked database via a communication interface. Or the computing device 200 may receive the input 240, such as conversation logs, from a user via the user interface.

In some embodiments, the document recommendation module 230 is configured to determine which models may be trained, train the appropriate models, and use the models to provide document recommendations. The document recommendation module 230 may further include data processing submodule 231 (e.g., similar to data processing module 104 in FIG. 1). Data processing submodule 231 may be configured to determine what data is available and in condition for training, and determine which models may be trained based on the available data. Data processing submodule 231 may also be configured to put the available data into a format suitable for training the document recommendation model. In some embodiments, data processing submodule 231 may monitor the available data over time in order to determine if the available data passes the threshold necessary to train an additional model (i.e., a sub-model of the document recommendation model).

The document recommendation module 230 may further include model training submodule 232 (e.g., similar to model training module 106 in FIG. 1). Model training submodule 232 may be configured to use the available data to train a document recommendation model. The trained model may be used to provide one or more vector representations of the documents, and may also be used to provide vector representations of a real-time text conversation. Model training submodule 232 may further be configured to update the document recommendation model periodically with additional data.

The document recommendation module 230 may further include model serving submodule 233 (e.g., similar to model serving module 108 in FIG. 1). Model serving submodule 233 may be configured to use the trained models to provide document recommendation based on real-time text conversations. In one embodiment, the document recommendation module 230 and its submodules 231-233 may be implemented by hardware, software and/or a combination thereof.

In one embodiment, the document recommendation module 230 and one or more of its submodules 231 may be implemented via an artificial neural network. The neural network comprises a computing system that is built on a collection of connected units or nodes, referred as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 220 as a structure of layers of neurons, and parameters describing the non-linear transformation at each neuron and the weights associated with edges connecting the neurons. An example neural network may be the document recommendation model and/or sub-models of the document recommendation model, and/or the like.

In one embodiment, the neural network based document recommendation module 230 and one or more of its sub-modules 231-233 may be trained by updating the underlying parameters of the neural network based on a loss function based on a comparison of a recommended document and a known (labeled) document. For example, a loss function is a metric that evaluates how far away a neural network model generates a predicted output value from its target output value (also referred to as the "ground-truth" value). Given a loss function, the negative gradient of the loss function is computed with respect to each weight of each layer individually. Such negative gradient is computed one layer at a time, iteratively backward from the last layer to the input layer of the neural network. Parameters of the neural network are updated backwardly from the last layer to the input layer (backpropagating) based on the computed negative gradient to minimize the loss. The backpropagation from the last layer to the input layer may be conducted for a number of training samples in a number of training epochs. In this way, parameters of the neural network may be updated in a direction to result in a lesser or minimized loss, indicating the neural network has been trained to generate a predicted output value closer to it target output value.

Some examples of computing devices, such as computing device 200 may include non-transitory, tangible, machine readable media that include executable code that when run by one or more processors (e.g., processor 210) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3:
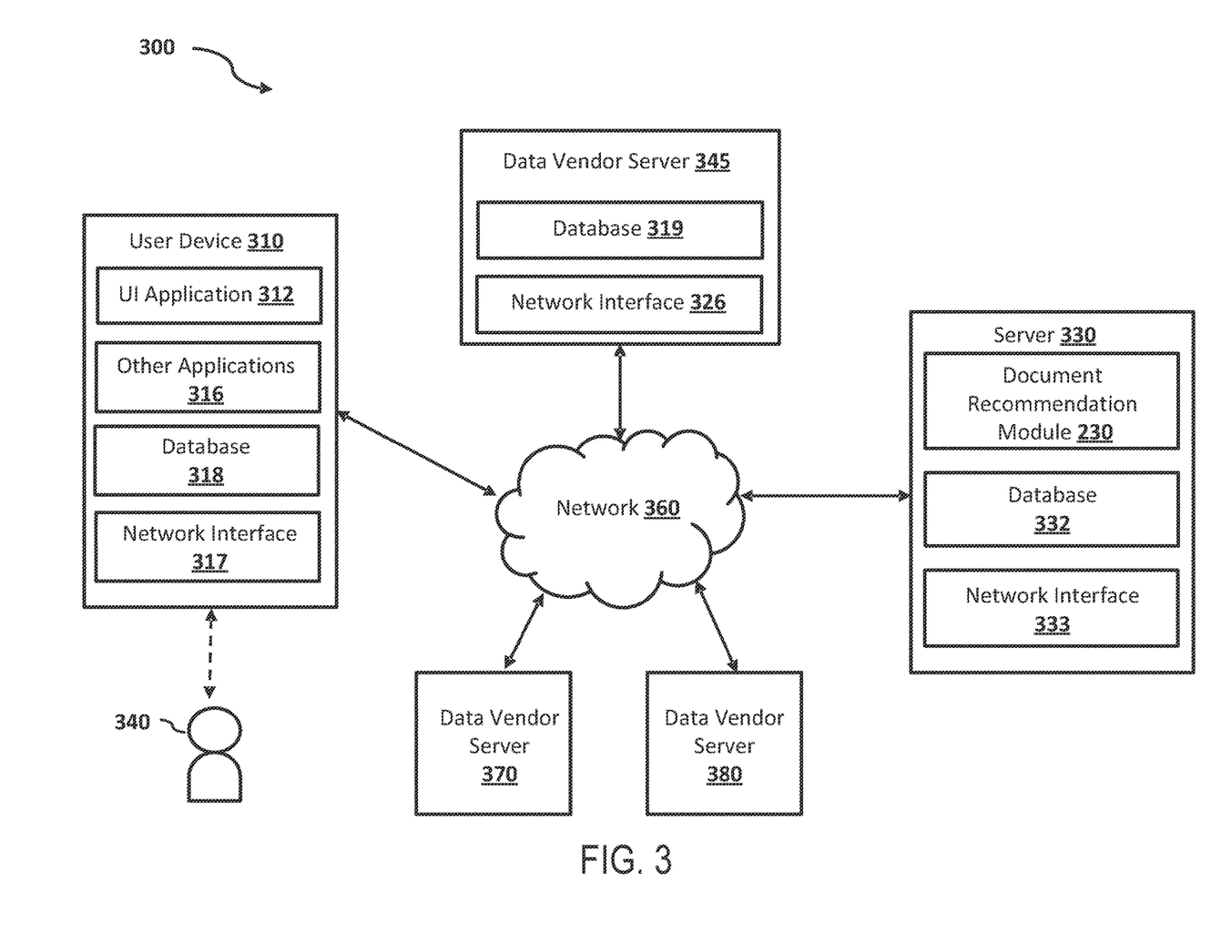
FIG. 3 is a simplified block diagram of a networked system suitable for implementing the document recommendation framework according to some embodiments.

FIG. 3 is a simplified block diagram of a networked system 300 suitable for implementing the document recommendation framework described herein. In one embodiment, system 300 includes the user device 310 which may be operated by user 340, data vendor servers 345, 370 and 380, server 330, and other forms of devices, servers, and/or software components that operate to perform various methodologies in accordance with the described embodiments. Exemplary devices and servers may include device, stand-alone, and enterprise-class servers which may be similar to the computing device 200 described in FIG. 2, operating an OS such as a MICROSOFT® OS, a UNIX® OS, a LINUX® OS, or other suitable device and/or server-based OS. It can be appreciated that the devices and/or servers illustrated in FIG. 3 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 310, data vendor servers 345, 370 and 380, and the server 330 may communicate with each other over a network 360. User device 310 may be utilized by a user 340 (e.g., a driver, a system admin, etc.) to access the various features available for user device 310, which may include processes and/or applications associated with the server 330 to receive an output data anomaly report.

User device 310, data vendor server 345, and the server 330 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

User device 310 may be implemented as a communication device that may utilize appropriate hardware and software configured for wired and/or wireless communication with data vendor server 345 and/or the server 330. For example, in one embodiment, user device 310 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 310 of FIG. 3 contains a user interface (UI) application 312, and/or other applications 316, which may correspond to executable processes, procedures, and/or applications with associated hardware. For example, the user device 310 may receive a message indicating a recommended document from the server 330 and display the message via the UI application 312. In other embodiments, user device 310 may include additional or different modules having specialized hardware and/or software as required.

In various embodiments, user device 310 includes other applications 316 as may be desired in particular embodiments to provide features to user device 310. For example, other applications 316 may include security applications for implementing client-side security features, programmatic client applications for interfacing with appropriate application programming interfaces (APIs) over network 360, or other types of applications. Other applications 316 may also include communication applications, such as email, texting, voice, social networking, and IM applications that allow a user to send and receive emails, calls, texts, and other notifications through network 360. For example, the other application 316 may be an email or instant messaging application that receives a prediction result message from the server 330. Ins some embodiments, an application which allows for the user to communicate with another user of another system (for example in a client support scenario), the application may display the generated document recommendations based on the current conversation taking place via the application. Other applications 316 may include device interfaces and other display modules that may receive input and/or output information. For example, other applications 316 may contain software programs for asset management, executable by a processor, including a graphical user interface (GUI) configured to provide an interface to the user 340 to view a recommended document, or an indication of a recommended document (e.g., the title of the document).

User device 310 may further include database 318 stored in a transitory and/or non-transitory memory of user device 310, which may store various applications and data and be utilized during execution of various modules of user device 310. Database 318 may store user profile relating to the user 340, predictions previously viewed or saved by the user 340, historical data received from the server 330, and/or the like. In some embodiments, database 318 may be local to user device 310. However, in other embodiments, database 318 may be external to user device 310 and accessible by user device 310, including cloud storage systems and/or databases that are accessible over network 360.

User device 310 includes at least one network interface component 317 adapted to communicate with data vendor server 345 and/or the server 330. In various embodiments, network interface component 317 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 345 may correspond to a server that hosts database 319 to provide training datasets including documents, conversation logs, etc. to the server 330. The database 319 may be implemented by one or more relational database, distributed databases, cloud databases, and/or the like.

The data vendor server 345 includes at least one network interface component 326 adapted to communicate with user device 310 and/or the server 330. In various embodiments, network interface component 326 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 345 may send asset information from the database 319, via the network interface 326, to the server 330.

The server 330 may be housed with the document recommendation module 230 and its submodules described in FIG. 2. In some implementations, document recommendation module 230 may receive data from database 319 at the data vendor server 345 via the network 360 to generate document recommendation. The generated document recommendations may also be sent to the user device 310 for review by the user 340 via the network 360.

The database 332 may be stored in a transitory and/or non-transitory memory of the server 330. In one implementation, the database 332 may store data obtained from the data vendor server 345. In one implementation, the database 332 may store parameters of the document recommendation module 230. In one implementation, the database 332 may store previously generated document recommendations, and the corresponding input feature vectors.

In some embodiments, database 332 may be local to the server 330. However, in other embodiments, database 332 may be external to the server 330 and accessible by the server 330, including cloud storage systems and/or databases that are accessible over network 360.

The server 330 includes at least one network interface component 333 adapted to communicate with user device 310 and/or data vendor servers 345, 370 or 380 over network 360. In various embodiments, network interface component 333 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 360 may be implemented as a single network or a combination of multiple networks. For example, in various embodiments, network 360 may include the Internet or one or more intranets, landline networks, wireless networks, and/or other appropriate types of networks. Thus, network 360 may correspond to small scale communication networks, such as a private or local area network, or a larger scale network, such as a wide area network or the Internet, accessible by the various components of system 300.

Figure 4:
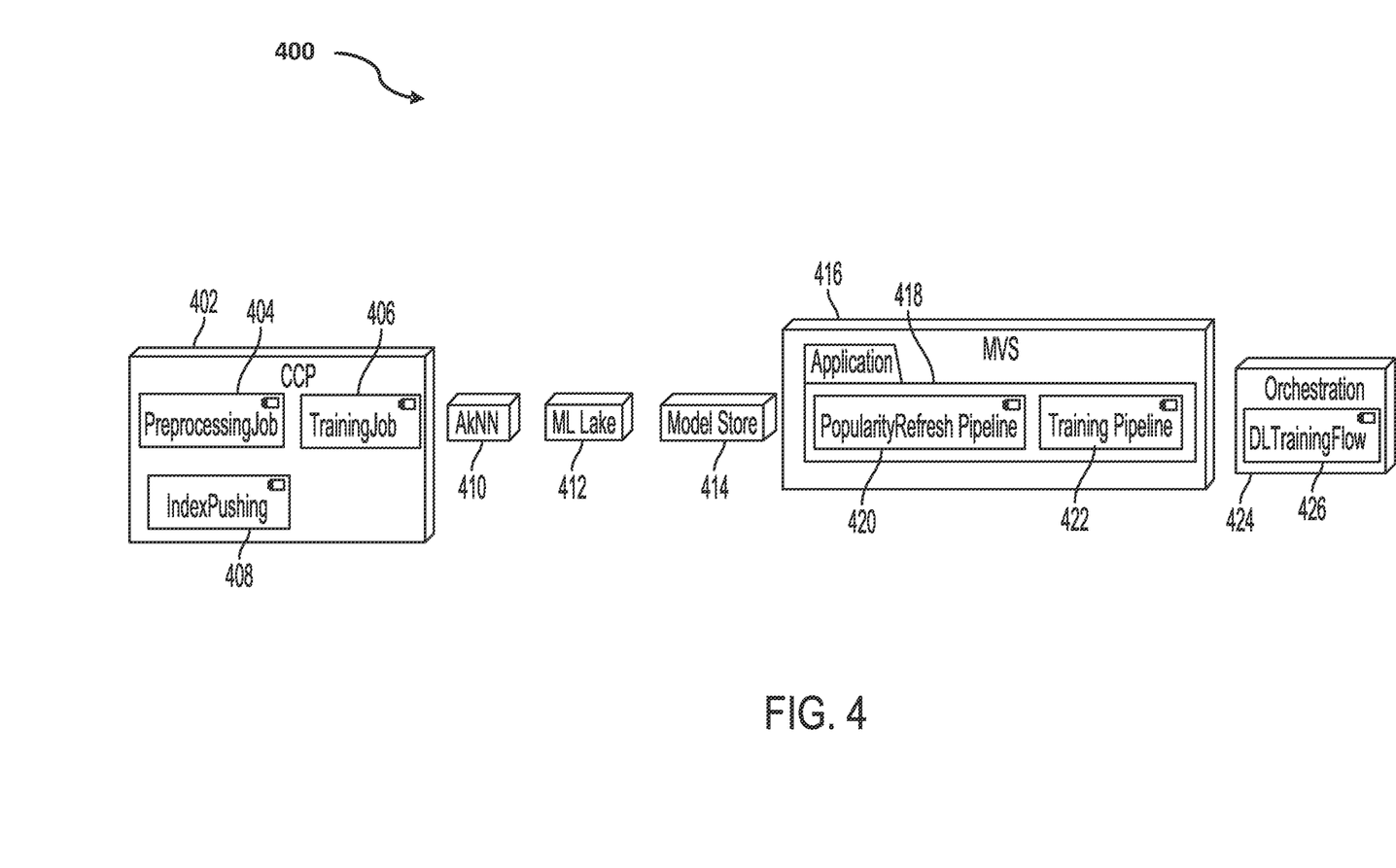
FIG. 4 is a simplified diagram illustrating training components of a document recommendation system according to some embodiments.

FIG. 4 is a simplified diagram 400 illustrating training components of a document recommendation system (e.g., as implemented in a software application) according to some embodiments. The illustrated components may be used to perform the methods described herein. Specifically, Compute control plane (CCP) 402 is a computation workflow manager which receives computational job requests, dynamically allocates computational resources (such as CPU/GPU, memory, and network resources), and tracks their health. In some embodiments, a system uses CCP for managing training jobs such as training the document recommendation model. For example, CCP 402 may manage a preprocessing job 404 for preprocessing training data (e.g., to flatten the document into textual sequences, and/or the like), a training job 406 for training a document recommendation model, and an index pushing job 408 which pushes (saves) the generated vectors to a vector database.

Approximate k-Nearest Neighbors (AkNN) 410 is a vector database. In some embodiments, the system uses AkNN 410 for storing and retrieving vectors, for example vector representations of documents. Machine Learning (ML) Lake 412 is a general file storage component. In some embodiments, the system uses ML Lake 412 for retrieving data sources in a multi-tenant manner (e.g., in multiple instances of the software application). Model Store 414 is a file storage component specialized for storing machine learning models (e.g., the document recommendation model). Specifically, it enforces input and output schemas on any files stored there. Such schemas include information on input/output formats required by the model. In some embodiments, the system uses Model Store 414 to store models during training and retrieve models for serving.

Model versioning system (MVS) 416 is a workflow database. MVS 416 stores versions of machine learning application definitions, pipelines, and their configurations. In some embodiments, MVS 416 is used for storing and executing popularity refresh pipeline 420, and training pipeline 422 of an application 418. Popularity refresh pipeline 420 may be used to update training data such as document popularity information based on updated document usage history. Such updating may occur periodically, intermittently and/or on an on-demand basis. Training pipeline 422 may be used to train and/or retrain the document recommendation model.

Orchestration 424 is a general workflow manager that calls out to individual training components such that a pipeline can be executed. In some embodiments, orchestration 424 may execute the training job DL training flow 426 to implement the training process 500 described below in relation to FIG. 5. Other components may be used in the system for training and utilizing a document recommendation model which are not illustrated here.

Figure 5:
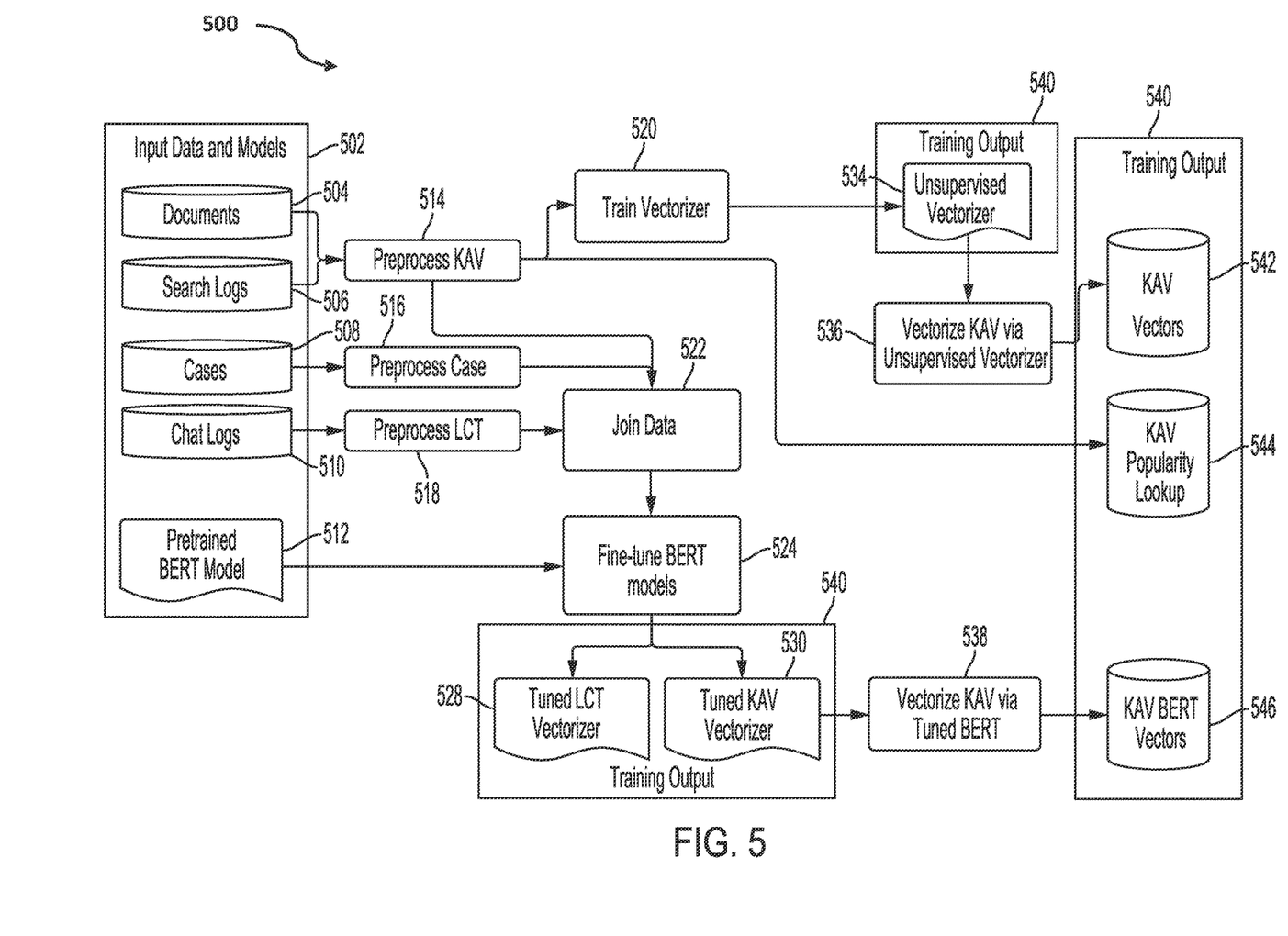
FIG. 5 is a block diagram of a training method for a document recommendation system according to some embodiments.

FIG. 5 is a block diagram of a training method for a document recommendation system according to some embodiments. Input Data and models 502 may include documents such as documents 504 (e.g., knowledge articles, "KAV"), search logs 506, cases 508, chat logs 510 (e.g., livechat transcripts, "LCT"), and pretrained models such as a pretrained BERT model 512. According to the illustrated data flow, the input data and models 502 may be used to generate training output 540 (illustrated across three blocks) which may include trained output models such as a tuned LCT vectorizer 528, a tuned KAV vectorizer 530, an unsupervised Vectorizer 534, KAV vectors 542, KAV popularity lookup 544, and KAV BERT vectors 546. As discussed below with reference to FIG. 6, these outputs may be used to provide a document recommendation based on a real-time text conversation (chat).

Specifically, Preprocess KAV 514 may preprocess documents 504 (e.g., knowledge articles) and search logs 506 to put them into a form which is usable by the subsequent processes. For example, the preprocessing modules 514, 516 and 518 may preprocess input data such as documents, search logs, cases, chat logs, and/or the like into input sequences of tokens for input into an NLP module. Train vectorizer 520 trains a model such as the unsupervised vectorizer 534. Unsupervised vectorizer 534 may be a BM25 Vectorizer, which is trained to generate a document representation which encodes the frequency and importance of each term in the document. The unsupervised vectorizer 534 may be used to generate vector representations of the documents, here KAV Vectors 542.

If search logs 506 are available, KAV vectors 542 may be generated based on search logs 506 as well. For example, the combination of documents 504 and search logs 506 may be combined into textual input at preprocessing module 514 to result in KAV vectors 542. If popularity information is available associated with the documents such as document usage frequency, then this data may be stored by preprocess KAV as KAV popularity lookup 544.

Cases 508 may contain information about specific cases (e.g., customer support cases) which may be associated with certain chat logs of chat logs 510. Cases and chat logs may be preprocessed by preprocess case 516 and preprocess LCT 518 respectively to put them into a usable form. After the preprocessing steps, Join Data 522 joins together the preprocessed data to be used by Fine-tune BERT models 524. In some embodiments, Join Data 522 (or another component) determines whether the contextual data (e.g., search logs 506, cases 508, and chat logs 510) are sufficient for training a supervised model. If it is determined there is not sufficient contextual data, then the document recommendation may proceed with only the unsupervised vectorizer 534 and associated KAV vectors 542. If there is sufficient data, then the process may continue to produce supervised models and associated vectors as follows.

Fine-tune BERT models 524 starts from a pre-trained BERT model (or another natural language encoder) and fine-tunes the model using the joined data as a supervisory signal in order to generate one or more output models. As illustrated, Fine-tune BERT models 524 may generate two models, a tuned LCT vectorizer 528, and a tuned KAV vectorizer 530. Tuned LCT vectorizer 528 may be used at inference to vectorize a real-time chat as described in FIG. 6. Tuned KAV vectorizer 530 may be used by vectorize KAV via Tuned BERT 538 to vectorize the documents 504, thereby generating KAV BERT Vectors 546. In some embodiments, tuned LCT vectorizer 528 and tuned KAV vectorizer 530 are a single tuned vectorizer used for both vectorizing the documents and vectorizing real-time chats.

The result of this training process, in the case of having sufficient contextual training data, results in a document recommendation model which includes multiple models (e.g., tuned LCT vectorizer 528, tuned KAV vectorizer 530, and unsupervised vectorizer 534), multiple vector representations of the documents (e.g., KAV vectors 542 and KAV BERT vectors 546), and potentially other data such as a KAV popularity lookup 544. The vectors and models may be periodically refreshed to account for the latest data as the input data and models 502 are added to over time. For example, a schedule may be established where KAV vectors 542 (with or without search data supplementation) are refreshed on a weekly basis, and tuned LCT vectorizer 528, the tuned KAV vectorizer 530, and the KAV BERT vectors 546 are refreshed/retrained on a monthly basis. As discussed in FIG. 6, the models and vectors generated by this process may be used for document recommendation.

Figure 6:
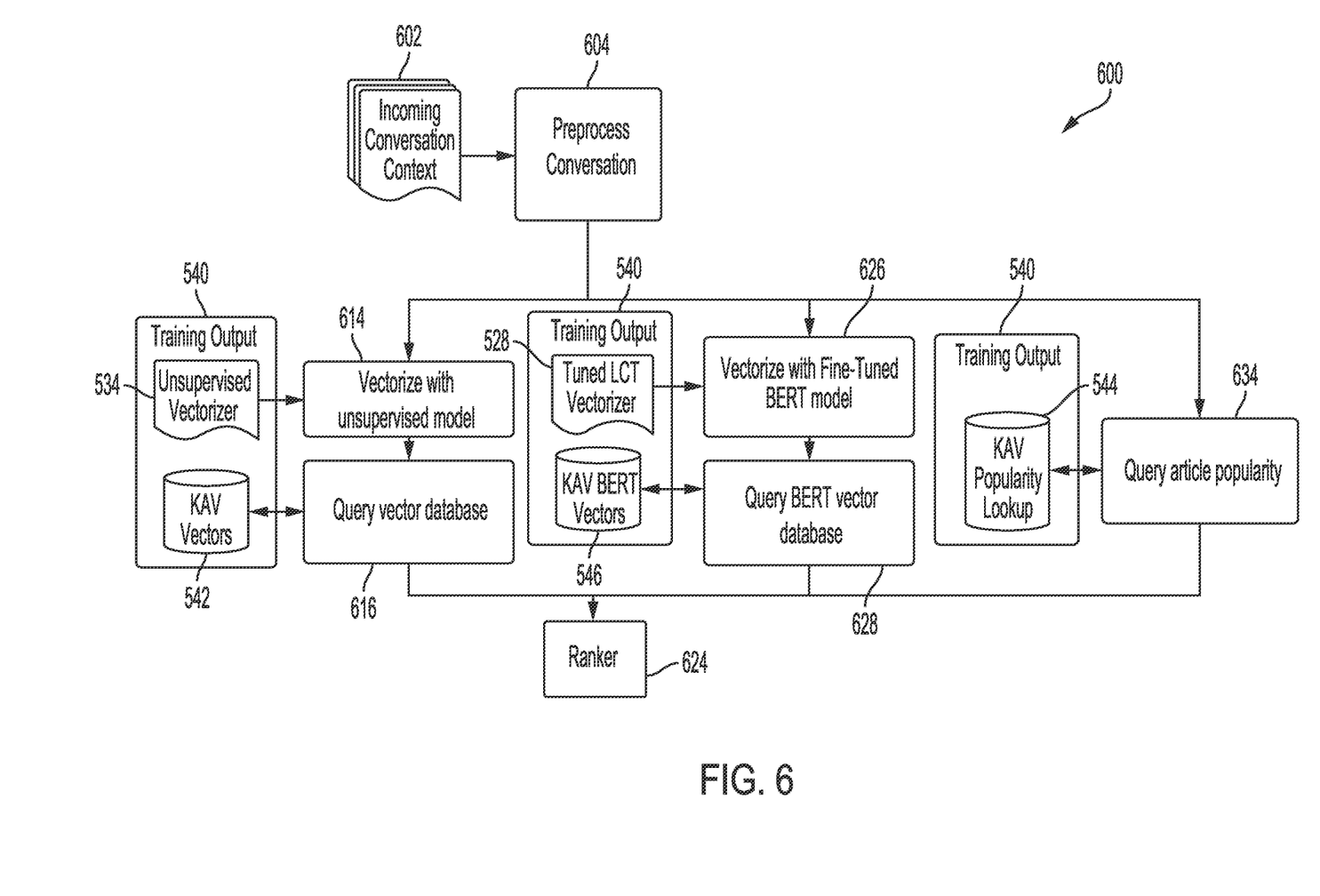
FIG. 6 illustrates a document recommendation model according to some embodiments.

FIG. 6 illustrates a document recommendation model according to some embodiments. An incoming conversation context 602 (e.g., a real-time chat) is preprocessed by preprocess conversation 604. The preprocessing by preprocess conversation 604 may include concatenating prior user utterance and system responses to generate an conversation representation such as a vector and/or sequence of tokens.

The preprocessed conversation may be vectorized with unsupervised model at step 614, using the unsupervised vectorizer 534. KAV vectors 542 may be queried at the step query vector database 616 so that the vector representations of the documents may be compared to the vector representation of the conversation 602. The result of the comparison may be computed by or communicated to ranker 624. For example, the ranker 624 may find the most similar vector based on a cosine similarity metric between the vector representation of the document and the vector representation of the conversation 602. Additional similarity metrics may be used to compare the vector representations, such as but not limited to L1 norm, min-max difference, and/or the like.

If a supervised model has been trained (e.g., a tuned LCT vectorizer 528 and/or KAV vectorizer 530), then the preprocessed conversation may also be vectorized separately and in parallel using the supervised model. As illustrated, the preprocessed conversation may be vectorized at the step vectorize with fine-tuned BERT model 626, which uses the trained tuned LCT vectorizer 528. KAV BERT vectors 546 may be queried at the step query BERT vector database 628 so that the vector representations of the documents may be compared to the vector representation of the conversation 602. The result of the comparison may be performed by or communicated to ranker 624.

The popularity of articles may also be retrieved at step query article popularity 634 which may retrieve it from KAV popularity lookup 544. The popularity of different documents (each document, or a subset of documents as determined by the results of the other vector comparisons) may also be communicated to ranker 624.

Ranker 624 may combine the results of the various vector comparisons and document popularities in order to determine a ranking of the documents. Ranker 624 may provide document recommendations to a user via a user interface based on the determined rankings. In some embodiments, a first rank (score) is determined based on the unsupervised model vectors, a second rank (score) is determined based on the supervised model vectors, and a third rank (score) is determined based on each document's popularity. Ranker 624 may combine, for example by weighted average, the individual rankings. If a supervised model is not trained due to a lack of supervising data, then ranker 624 may determine a document rank (and thereby recommendation) based on only the unsupervised model vectors.

Example Work Flows

Figure 7:
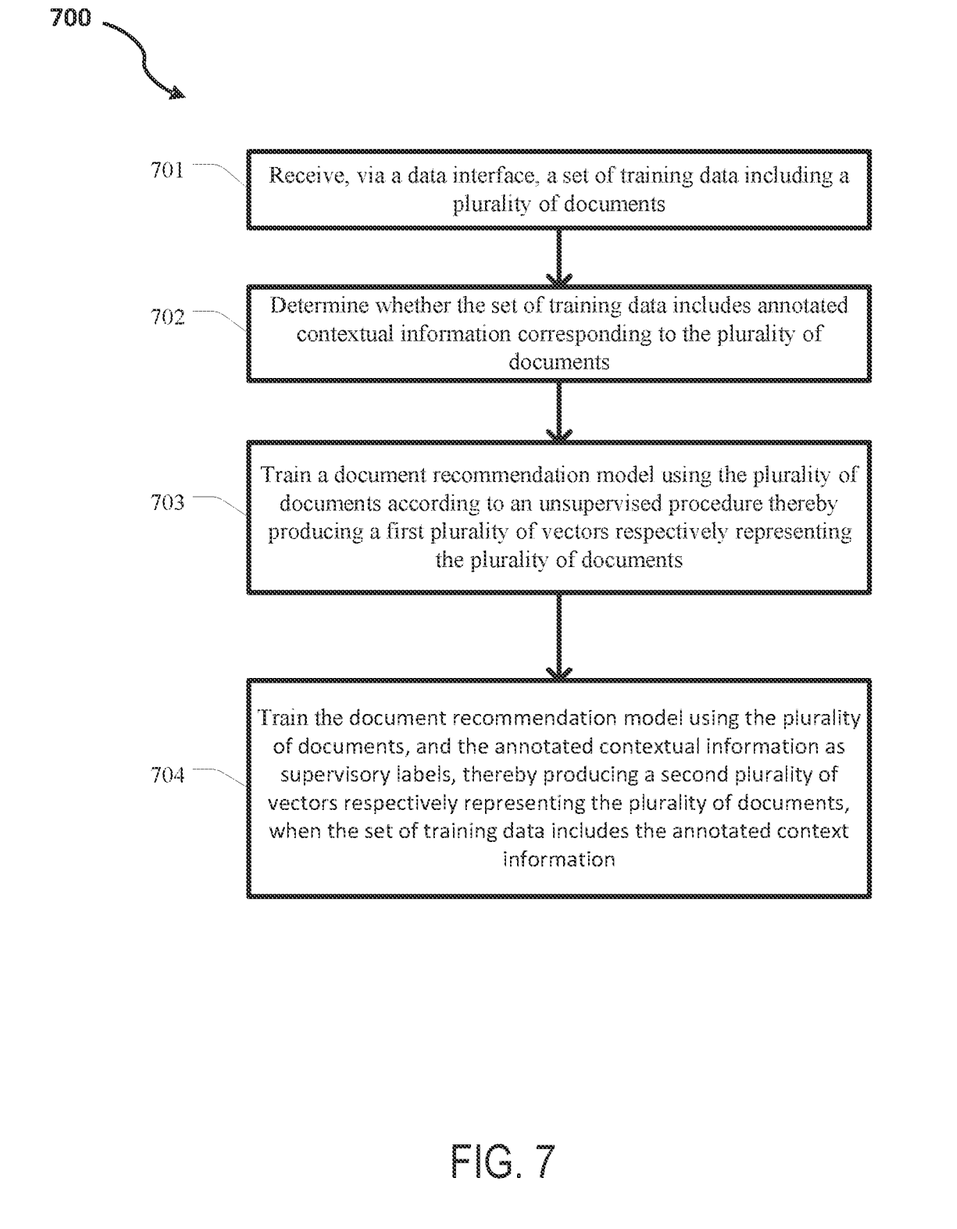
FIG. 7 is an example logic flow diagram illustrating a method of training a document recommendation system according to some embodiments.

FIG. 7 is an example logic flow diagram illustrating a method of training a document recommendation system based on the framework shown in FIGS. 1-6, according to some embodiments described herein. One or more of the processes of method 700 may be implemented, at least in part, in the form of executable code stored on non-transitory, tangible, machine-readable media that when run by one or more processors may cause the one or more processors to perform one or more of the processes. In some embodiments, method 700 corresponds to the operation of the document recommendation module 230 (e.g., FIGS. 2-3) that trains a document recommendation model.

As illustrated, the method 700 includes a number of enumerated steps, but aspects of the method 700 may include additional steps before, after, and in between the enumerated steps. In some aspects, one or more of the enumerated steps may be omitted or performed in a different order.

At step 701, a system receives, via a data interface (e.g. data interface 215 and/or network 360), a set of training data including a plurality of documents (e.g., documents 504 in FIG. 5). The training data may also include one or more pre-trained model, such as pretrained BERT model 512 in FIG. 5. The data which is available for training may change over time. For example, additional documents may be added to a database.

At step 702, the system determines whether the set of training data includes annotated contextual information (e.g., search logs 506, chat logs 510, and/or cases 508 in FIG. 5) corresponding to the plurality of documents. Some of the items may be directly associated with the documents. In some embodiments, the contextual data is indirectly associated with documents, for example a chat log may be associated with a case, and that case may also be associated with a document, thereby associating the chat log with the document.

At step 703, the system trains a document recommendation model using the plurality of documents according to an unsupervised procedure (e.g., as in train vectorizer 520 in FIG. 5), thereby producing a first plurality of vectors (e.g., KAV vectors 542 in FIGS. 5-6) respectively representing the plurality of documents. Here, the document recommendation model may include multiple sub-models (e.g., a supervised model and an unsupervised model) in addition to other features such as a popularity lookup such as KAV popularity lookup 544 in FIGS. 5-6. The document recommendation model may also include a mechanism for combining the outputs of different models to produce a single result.

At step 704, the system trains the document recommendation model using the plurality of documents, and the annotated contextual information as supervisory labels (e.g., as in fine-tune BERT models 524 in FIG. 5), thereby producing a second plurality of vectors (e.g., KAV BERT vectors 546 in FIGS. 5-6) respectively representing the plurality of documents, when the set of training data includes the annotated contextual information. This training may be performed in response to a determination that an amount of annotated contextual information is above a predetermined threshold. Individual items of the annotated contextual information may be included in the determined amount if they are in a selected natural language. For example, a user may indicate via a user interface selection that only items in English or French should be included in the training. When determining if there is sufficient contextual information, the system would then only consider items in English and French, ignoring items in Spanish.

Training may be performed at intervals, and/or in response to a determination that additional data is available. For example, if the initial training did not train the supervised model for lack of sufficient contextual data, then at a later time if sufficient data is determined to be available, the supervised model may then be trained. The system may also periodically (e.g., weekly) reevaluate the available data, and re-train the models including the new data.

Figure 8:
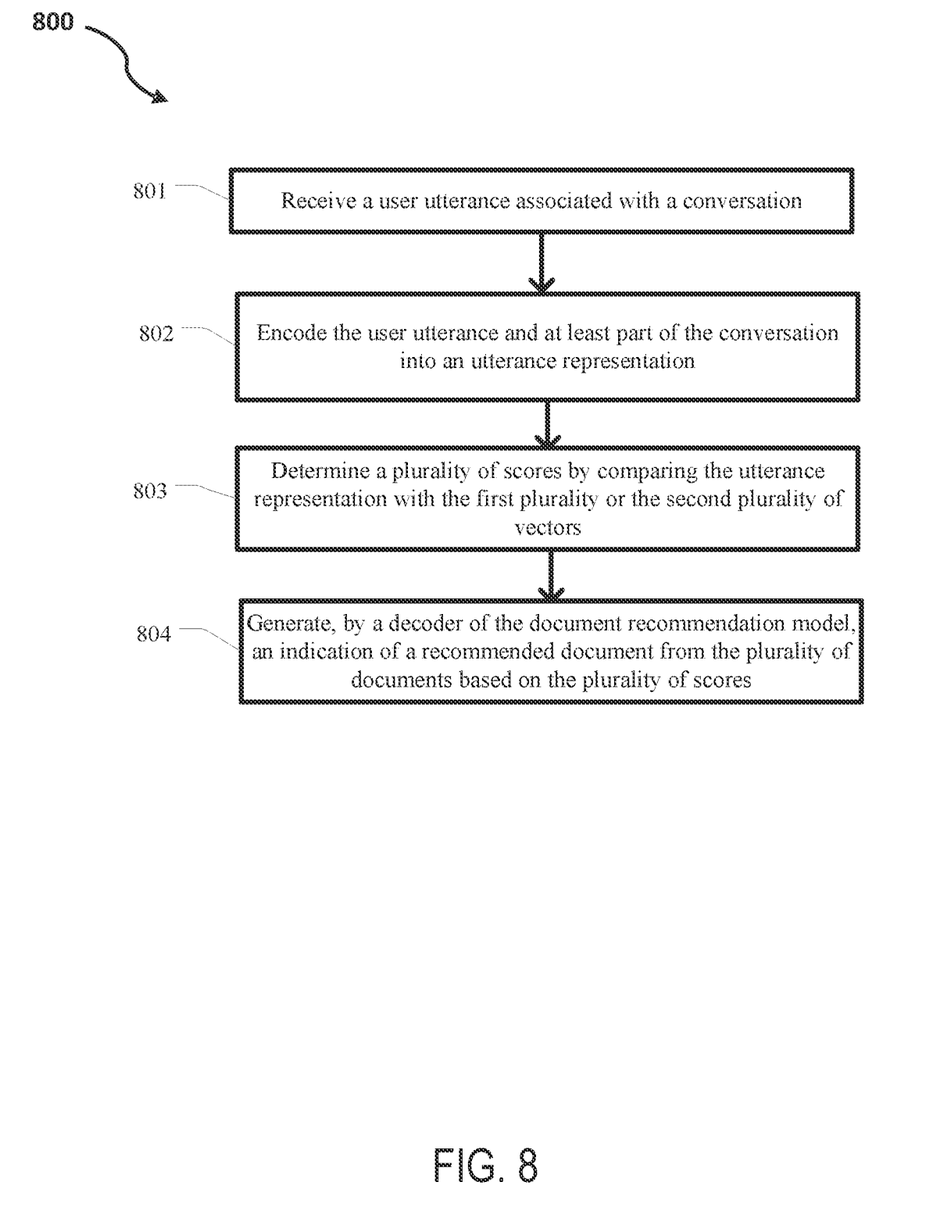
FIG. 8 is an example logic flow diagram illustrating a method of document recommendation according to some embodiments.

FIG. 8 is an example logic flow diagram illustrating a method of document recommendation based on the framework shown in FIGS. 1-6, according to some embodiments described herein. One or more of the processes of method 800 may be implemented, at least in part, in the form of executable code stored on non-transitory, tangible, machine-readable media that when run by one or more processors may cause the one or more processors to perform one or more of the processes. In some embodiments, method 800 corresponds to the operation of the document recommendation module 230 (e.g., FIGS. 2-3) that performs document recommendation using a trained model (e.g., in association with a real-time text conversation).

The method 800 may be performed after method 700 by either the same system or a separate system. Methods 700 and 800 may be performed repeatedly over time, for example method 700 may periodically be used to retrain models, with method 800 utilizing the trained models between each retraining. As illustrated, the method 800 includes a number of enumerated steps, but aspects of the method 800 may include additional steps before, after, and in between the enumerated steps. In some aspects, one or more of the enumerated steps may be omitted or performed in a different order.

At step 801, a system receives a user utterance associated with a conversation (e.g., incoming conversation context 602 in FIG. 6). The user utterance may be received from another system, another application within the same system, or from another component within the same application. For example, a chat portion of an application associated with a user interface for communication between users may communicate utterances as they occur in real-time to the user recommendation model for processing.

At step 802, the system encodes the user utterance and at least part of the conversation into an utterance representation (e.g., as in preprocess conversation 604 in FIG. 6).

At step 803, the system determines a plurality of scores by comparing the utterance representation with the first plurality or the second plurality of vectors. For example, the closer the utterance is to the first and/or second plurality of vectors, the higher (or lower) the respective rank score for that document may be. Each document, or a subset of all the documents, may be assigned a rank score based on this comparison, as described in FIG. 6.

At step 804, the system generates, by a decoder of the document recommendation model, an indication of a recommended document from the plurality of documents based on the plurality of scores (e.g., as in ranker 624 in FIG. 6). The indication of the recommended document may be based on a first comparison between the representation of the utterance and the first plurality of vectors, and further based on a comparison between the representation of the utterance and the second plurality of vectors. The document recommendation may be further based on respective popularity scores associated with the plurality of documents (e.g., using KAV popularity lookup 544 in FIGS. 5-6), wherein the respective popularity scores are based on a frequency with which each document of the plurality of documents is accessed. For example, one vector comparison may result in a first rank score for each document, and the second vector comparison may result in a second rank score for each document. The first and second ranked scores may be combined (e.g., via a weighted average) to produce a composite rank score. The popularity score may also contribute to the composite rank score as an addition term in the weighted average. One or more documents may be recommended by the system based on their composite rank scores. In some embodiments, only the top-ranking document or predetermined number of documents are recommended. In other embodiments, every document above a predetermined score threshold is recommended. In yet further embodiments, if no document's rank score is above a predetermined threshold, then no document is recommended, and the system will continue to update the recommendation as it receives additional utterances.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of document recommendation, the method comprising:
   receiving, via a data interface, a set of training data including a plurality of documents;
   determining whether the set of training data includes annotated contextual information corresponding to the plurality of documents;
   training a document recommendation model using the plurality of documents according to an unsupervised procedure thereby producing a first plurality of vectors respectively representing the plurality of documents;
   training the document recommendation model using the plurality of documents, and the annotated contextual information as supervisory labels, thereby producing a second plurality of vectors respectively representing the plurality of documents, when the set of training data includes the annotated contextual information;
   receiving a user utterance associated with a conversation;
   encoding the user utterance and/or at least part of the conversation into a conversation representation;
   determining a plurality of scores by comparing the conversation representation with the first plurality or the second plurality of vectors; and
   generating, by a decoder of the document recommendation model, an indication of a recommended document from the plurality of documents based on the plurality of scores.

2. The method of claim 1, further comprising:
   determining a document recommendation based on a first comparison between the representation of the utterance and the first plurality of vectors, and further based on a comparison between the representation of the utterance and the second plurality of vectors,
   wherein the indication of the recommended document is based on the document recommendation.

3. The method of claim 1, wherein the training the document recommendation model using the annotated contextual information is performed in response to a determination that an amount of annotated contextual information is above a predetermined threshold.

4. The method of claim 3, wherein individual items of the annotated contextual information are included in the determined amount if they are in a selected natural language.

5. The method of claim 1, further comprising:
   training the document recommendation model using the plurality of documents, and the annotated contextual information as supervisory labels a second time in response to a determination that additional annotated contextual information is available.

6. The method of claim 1, wherein the generating the indication of the recommended document is further based on respective popularity scores associated with the plurality of documents, wherein the respective popularity scores are based on a frequency with which each document of the plurality of documents is accessed.

7. The method of claim 1, wherein the determining the plurality of scores comprises computing each respective score of the plurality of scores by a weighted sum of a first score associated with the first plurality of vectors and a second score associated with the second plurality of vectors.

8. A system for document recommendation, the system comprising:
   a memory that stores a document recommendation model and a plurality of processor executable instructions;
   a communication interface that receives a set of training data including a plurality of documents; and
   one or more hardware processors that read and execute the plurality of processor-executable instructions from the memory to perform operations comprising:
      determining whether the set of training data includes annotated contextual information corresponding to the plurality of documents;
      training the document recommendation model using the plurality of documents according to an unsupervised procedure thereby producing a first plurality of vectors respectively representing the plurality of documents;

training the document recommendation model using the plurality of documents, and the annotated contextual information as supervisory labels, thereby producing a second plurality of vectors respectively representing the plurality of documents, when the set of training data includes the annotated contextual information;

receiving a user utterance associated with a conversation;

the user utterance and/or at least part of the conversation into a conversation representation;

determining a plurality of scores by comparing the conversation representation with the first plurality or the second plurality of vectors; and generating, by a decoder of the document recommendation model, an indication of a recommended document from the plurality of documents based on the plurality of scores.

9. The system of claim 8, the operations further comprising:

determining a document recommendation based on a first comparison between the representation of the utterance and the first plurality of vectors, and further based on a comparison between the representation of the utterance and the second plurality of vectors, wherein the indication of the recommended document is based on the document recommendation.

10. The system of claim 8, wherein the training the document recommendation model using the annotated contextual information is performed in response to a determination that an amount of annotated contextual information is above a predetermined threshold.

11. The system of claim 10, wherein individual items of the annotated contextual information are included in the determined amount if they are in a selected natural language.

12. The system of claim 8, the operations further comprising:

training the document recommendation model using the plurality of documents, and the annotated contextual information as supervisory labels a second time in response to a determination that additional annotated contextual information is available.

13. The system of claim 8, wherein the generating the indication of the recommended document is further based on respective popularity scores associated with the plurality of documents, wherein the respective popularity scores are based on a frequency with which each document of the plurality of documents is accessed.

14. The system of claim 8, wherein the determining the plurality of scores comprises computing each respective score of the plurality of scores by a weighted sum of a first score associated with the first plurality of vectors and a second score associated with the second plurality of vectors.

15. A non-transitory machine-readable medium comprising a plurality of machine-executable instructions which, when executed by one or more processors, are adapted to cause the one or more processors to perform operations comprising:

receiving, via a data interface, a set of training data including a plurality of documents;

determining whether the set of training data includes annotated contextual information corresponding to the plurality of documents;

training a document recommendation model using the plurality of documents according to an unsupervised procedure thereby producing a first plurality of vectors respectively representing the plurality of documents;

training the document recommendation model using the plurality of documents, and the annotated contextual information as supervisory labels, thereby producing a second plurality of vectors respectively representing the plurality of documents, when the set of training data includes the annotated contextual information;

receiving a user utterance associated with a conversation;

encoding the user utterance and/or at least part of the conversation into a conversation representation;

determining a plurality of scores by comparing the conversation representation with the first plurality or the second plurality of vectors; and generating, by a decoder of the document recommendation model, an indication of a recommended document from the plurality of documents based on the plurality of scores.

16. The non-transitory machine-readable medium of claim 15, the operations further comprising:

determining a document recommendation based on a first comparison between the representation of the utterance and the first plurality of vectors, and further based on a comparison between the representation of the utterance and the second plurality of vectors, wherein the indication of the recommended document is based on the document recommendation.

17. The non-transitory machine-readable medium of claim 15, wherein the training the document recommendation model using the annotated contextual information is performed in response to a determination that an amount of annotated contextual information is above a predetermined threshold.

18. The non-transitory machine-readable medium of claim 17, wherein individual items of the annotated contextual information are included in the determined amount if they are in a selected natural language.

19. The non-transitory machine-readable medium of claim 15, the operations further comprising:

training the document recommendation model using the plurality of documents, and the annotated contextual information as supervisory labels a second time in response to a determination that additional annotated contextual information is available.

20. The non-transitory machine-readable medium of claim 15, wherein the generating the indication of the recommended document is further based on respective popularity scores associated with the plurality of documents, wherein the respective popularity scores are based on a frequency with which each document of the plurality of documents is accessed.

21. The non-transitory machine-readable medium of claim 15, wherein the determining the plurality of scores comprises computing each respective score of the plurality of scores by a weighted sum of a first score associated with the first plurality of vectors and a second score associated with the second plurality of vectors.

* * * * *